(12) United States Patent
Camenisch et al.

(10) Patent No.: US 8,522,040 B2
(45) Date of Patent: Aug. 27, 2013

(54) OBLIVIOUS TRANSFER WITH ACCESS CONTROL

(75) Inventors: Jan Leonhard Camenisch, Ruschlikon (CH); Maria Dubovitskaya, Moscow (RU); Gregory Neven, Ruschlikon (CH)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 12/909,302

(22) Filed: Oct. 21, 2010

(65) Prior Publication Data

US 2011/0145589 A1    Jun. 16, 2011

(30) Foreign Application Priority Data

Oct. 21, 2009    (EP) ..................................... 09173587

(51) Int. Cl.
*H04L 29/06*    (2006.01)

(52) U.S. Cl.
USPC ................. 713/185; 380/44; 380/45; 380/46; 713/193; 705/317

(58) Field of Classification Search
USPC ................. 380/44–46; 713/185, 193; 705/7, 705/317
See application file for complete search history.

(56) References Cited

PUBLICATIONS

Coull et al., "Controlling Access to an Oblivious Database using Staeful Anonymous Credentials", Proc. of the 12th International Conference on Practice and Theory in Public Key Cryptography: PKC '09, pp. 501-520.*

Goyal et al., "Attribute-Based Encryption for Fine-Grained Access Control of Encrypted Data", 2006, http://eprint.iacr.org/2006/309.pdf. pp. 1-28.*

Camenisch, Neven and Shelat, "Simulatable adaptive oblivious transfer", EUROCRYPT 2007, vol. 4515 of LNCS, pp. 573-590, Springer Verlag, 2007.

Aiello, Ishai and Reingold, "Priced oblivious transfer: How to sell digital goods", EUROCRYPT 2001, vol. 2045 of LCNS, pp. 119-135, Springer-Verlag, 2001.

Di Crescenzo, Ostrovsky, and Rajagopolan, "Conditional oblivious transfer and timed-release encryption", EUROCRYPT '99, vol. 1592 of LNCS, pp. 74-89, Springer-Verlag, 1999.

Herranz, "Restricted adaptive oblivious transfer", Cryptology ePrint Archive, Report 2008/182, 2008, http://eprint.iacr.org.

Coull, Green, and Hohenberger, "Controlling Access to an Oblivious Database using Stateful Anonymous Credentials", Proc. of the 12th International Conference on Practice and Theory in Public Key Cryptography: PKC '09, pp. 501-520.

M.H. Au, W. Susilo, and Y. Mu "Constant-size dynamic k-TAA", Proc. Of SCN 06, vol. 4116 of LNCS, pp. 111-125, Springer Verlag 2006.

(Continued)

*Primary Examiner* — Brandon Hoffman
*Assistant Examiner* — Hee Song
(74) *Attorney, Agent, or Firm* — Harrington & Smith

(57) ABSTRACT

A protocol for anonymous access to a database where the different records have different access control permissions is described. The permissions can be attributes, roles or rights that an authorized user needs to have to access the record. The database provider does not learn which record the user accesses and which attributes or roles the user has when she accesses the database. The database provider publishes the encrypted database where each record is encrypted with a key that is derived from at least the index of the record, its access control attributes and a secret key of the database provider. The user obtains a credential from an issuer for each access control attribute (ACL) that is associated with the user. Then the user retrieves the key for a particular record from the database provider and uses this key to decrypt the encrypted record.

18 Claims, 11 Drawing Sheets

(56) References Cited

PUBLICATIONS

J. Camenisch "Group Signature Schemes and Payment Systems Based on the Discrete Logarithm Problem", PhD Thesis, ETH Zurich, 1998.

J. Camenisch, M. Michels "Proving in zero-knowledge that a number n is the product of two safe primes", Proc. Of EUOCRYPTT '99, vol. 1592 of LNCS, Springer Verlag 1999.

D. Chaum and T.P. Pedersen "Wallet databases with observers", Proc. Of Crypto '92, vol. 740 of LNCS, pp. 89-105, Springer Verlag 1993.

C.P. Schnorr "Efficient signature generation for smart cards", Journal of Cryptology, 4(3):239-252, 1991.

T. ElGamal "A public key cryptosystem and a signature scheme based on discrete logarithms", IEEE Transactions on Information Theory, 31(4), pp. 469-472, 1985.

M.H. Au Au, W. Susilo, and Y. Mu "Constant-size dynamic k-TAA", Proc. Of SCN 06, vol. 4116 of LNCS, pp. 111-125, Springer Verlag 2006.

S. Brands "Rapid demonstration of linear relations connected by Boolean operators", Proc. Of EUROCRYPT '97, vol. 1233 of LNCS, pp. 318-333, Springer Verlag 1997.

J. Camenisch, A. Kiayias, M. Yung "On the portability of generated schnorr proofs", Proc. Of CUROCRYPT 2009, LNCS, Springer Verlag 2009.

R. Cramer, I. Damgard, B. Schoenmakers "Proofs of partial knowledge and simplified design of witness hiding protocols", Proc. Of CRYPTO '94, vol. 839 of LNCS, pp. 174-187, Springer Verlag 1994.

A. Fiat and A. Shamir "How to prove yourself; Practical solutions to identification and signature problems", Proc of CRYPTO '86, vol. 263 of LNCS, pp. 186-194, Springer Verlag 1987.

D. Boneh, X. Boyen, H. Shacham "Short group signatures", Proc of CRYPTO 2004, vol. 3152 of LNCS, Springer Verlag 2004.

J. Camenisch "Group Signature Schemes and Payment Systems Based on the Discrete Logarith Problem", PhD Thesis, ETH Zurich, 1998.

J. Camenisch, M. Michels "Proving in zero-knowledge that a number n is the product of two safe primes", Proc. Of EUROCRYPTT '99, vol. 1592 of LNCS, Springer Verlag 1999.

D. Chaum and T.P. Pedersen "Wallet databases with observers". Proc. Of CRYPTO '92, vol. 740 of LNCS, pp. 89-105, Springer Verlag 1993.

Y. Dodis, A. Yampolskiy "A verifiable random function with short proofs and keys", Proc. Of PKC 2005, vol. 3386 of LNCS, pp. 416-431, 2005.

C.P. Schnorr "Efficient signature generation for smart cards", Journal of Cryptology, 4(43):239-252, 1991.

D. Boneh and X. Boyen "Short signatures without random oracles", Proc. Of EUROCRYPT 2004, vol. 3027 of LNCS, pp. 56-73, Spinger Verlag 2004.

Camenisch and Stadler "Efficient group signature schemes for large groups", Proc. Of '97, vol. 1296 of LNCS, pp. 410-424, Springer Verlag 1997.

J. Camenisch, A. Lysyanskaya "Signature schemes and anonymous credentials from bilinear maps", Proc. Of CRYPTO 2004, vol. 3152 of LNCS, pp. 56-72, Springer Verlag 1999.

R. Cramer, I. Damgard, and P.D. MacKenzie "Efficient zero-knowledge proofs of knowledge without intractability assumptions", Proc. Of PKC 2000, vol. 1751 of LNCS, pp. 354-372, Springer Verlag 2000.

T. ElGamal "A public key cryptosystem and a signature scheme based on discrete logarithms", IEEE Transactions on Information Theory, 31(4), pp. 469-472, 1985.

J. Camenisch, G. Neven, and Abhi Shelat "Simulatable Adaptive Oblivious Transfer", Proc. of EUROCRYPT 2007, vol. 4515 of LNCS, pp. 573-590, Springer Verlag 2007.

\* cited by examiner

ISetup(C):

$(G, G_T, p) \xleftarrow{\$} Pg(1^k)$ $g_t, h_t \xleftarrow{\$} G_T^*$ ; $g_1, h_0, h_1, h_2, u, v \xleftarrow{\$} G^*$ $x_I \xleftarrow{\$} Z_p$ ; $y_I \xleftarrow{\$} g_1^{x_I}$ $sk_I \leftarrow x_I$ ; $pk_I \leftarrow (g_1, h_0, h_1, h_2, u, v, w, g_t, h_t, y_I)$ Return $(sk_I, pk_I)$ $\underline{\text{DBSetup}(pk_I, DB = (R_i, ACL_i)_{i=1,\ldots,N}):}$ $(\bar{G}, \bar{G}_T) \xleftarrow{\$} Pg(p)$ ; $g, h \xleftarrow{\$} \bar{G}^*$ ; $H \leftarrow \bar{e}(g, h)$ $x_{DB} \xleftarrow{\$} Z_p$ ; $y_{DB} \leftarrow g^{x_{DB}}$ For $i = 1, \ldots \ell$ do $x_i \xleftarrow{\$} Z_p$ ; $y_i \leftarrow g^{x_i}$ $sk_{DB} \leftarrow (h, x_{DB}, x_1, \ldots, x_\ell)$ $pk_{DB} \leftarrow (g, H, y_{DB}, y_1, \ldots, y_\ell)$ For $i = 1, \ldots, N$ do Parse $ACL_i$ as $(c_{i1}, \ldots, c_{i\ell})$ $E_i \leftarrow g^{\frac{1}{x_{DB} + i + \sum_{j=1}^{\ell} x_j \cdot c_{ij}}}$ $F_i \leftarrow e(h, E_i) \cdot R_i$ $ER_i \leftarrow (E_i, F_i)$ Return $((pk_{DB}, ER_1, \ldots ER_N), sk_{DB})$

FIG. 5

Issue( ) :

$U(c, st_U, pk_1)$ ;

If ($st_U = \perp$) then
$\quad z_U \xleftarrow{\$} Z_p$ ; $P \leftarrow h_0^{z_U}$
$\quad st_U \leftarrow (z_U, P, 0, \phi, \phi)$
Parse $st_U$ as $(z_U, P, f_{DB}, C_U, Cred_U)$ $\xrightarrow{\quad P \quad}$ $\xrightarrow{PK \{(z_U) ; P = h_0^{z_U}\}}$ $\xleftarrow{\quad s_c, A_c \quad}$ If $e(A_c, g_1^{s_c} y_I) = c(g_1 Ph_1^c h_2^{r_c}, g_1)$ then
$\quad C_U \leftarrow C_U \cup \{c\}$ ; $Cred_U \leftarrow Cred_U \cup \{(A_c, s_c, r_c)\}$
Return $st_U \leftarrow (z_U, P, f_{DB}, C_U, Cred_U)$ $I(sk_1, pk_1, c, [P])$ ;

If $P$ already assigned
then return $\perp$ $s_c, r_c \xleftarrow{\$} Z_p$ $A_c \leftarrow (g_1 Ph_1^c h_2^{r_c})^{\frac{1}{x_1 + s_c}}$

FIG. 7

OBLIVIOUS TRANSFER WITH ACCESS CONTROL

CROSS REFERENCE TO RELATED APPLICATIONS

This application claims priority to EP application No. 09173587.8 filed on Oct. 21, 2009, the entire content of which is hereby incorporated herein by reference.

BACKGROUND

The present disclosure relates to a method for anonymously reading database records, where the different records have different access control permissions. These permissions could be attributes, roles, or rights that the database user needs to have in order to access the record.

More and more transactions in daily life are performed electronically. People enter their credentials online and into various databases and disclose their personal information to different organisations with the belief that small amounts of information cannot reveal enough about them to impact them in a negative way. When using the internet extensively however, they can give away much more information about themselves than they may care to admit.

Also to protect sensitive information such as medical or financial data strong access control needs to be provided to ensure that only those people who have the necessary rights and permissions can access it. But gathering statistics about what sort of data people query also gives a lot of information about them. It is possible to build a complete picture of someone's movements, transactions, whereabouts and relationships from the trail left from interaction with websites and various databases. To protect the users' privacy, it is important that all electronic transactions can be performed without revealing more personal information than is absolutely necessary.

Considering the case of access to a database where the different records in the database have different access control conditions, these conditions could be certain attributes, roles, or rights that a user needs to have to access the records. The assigning of attributes to users is done by a separate entity called the issuer, external to the database. To provide the maximal amount of privacy, a protocol is required such that:
  Only users satisfying the access conditions for a record can access that record;
  The service (database) provider does not learn which record a user accesses;
  The service (database) provider shall neither learn which attributes, roles, etc. a user has when she accesses a record, i.e., access shall be completely anonymous, nor shall it learn which attributes the user was required to have to access the record.

Real-life examples where this is important are DNA (Deoxyribonucleic acid) databases, which contain information about the purpose of each gene. Such databases are extremely valuable and thus these are not sold on a whole, but rather customers are charged per access to the database. On the other hand, the particular DNA sequences accessed by a customer reveal a lot of information about its interests, e.g., for which disease it is developing medication. Moreover, it is quite likely that subscription prices vary with the different species. Using the protocol, the database can charge different rates for the DNA sequences of mice and apes, without forcing its customers to reveal which species they are interested in.

Other examples of databases where users have an interest to keep their queries hidden are stock quotes, since they can reveal information about their investment strategy, and patent search, since they can reveal sensitive business information.

SUMMARY

According to one embodiment of the present disclosure, a computer system is described. The computer system includes:
  a database server having publishing means to publish an encrypted form of a database, the database including at least one record with an associated index and a list of access-control attributes for each record;
  at least one user of the database; and
  an Issuer having means to provide a credential for each access-control attribute of the database, which is assigned to the at least one user.
In one particular embodiment,
  the publishing means is responsive to database encryption means. In particular, the database encryption means includes:
    key generation means to generate an encryption key for a record such that the encryption key is derived from at least the index of the record and the access-control attributes and a secret key of the database server.
In another particular embodiment, record encryption means responsive to the key generation means to encrypt a database record with the encryption key.

According to another embodiment of the present disclosure, a method and a corresponding computer program and a corresponding computer program product for anonymously reading records from a database provided by a database server, wherein the database includes at least one record with an associated index and a list of access-control attributes for each record, and wherein the database provider publishes an encrypted form of the database, and wherein at least one user of the database obtains credentials from an Issuer for each access-control attribute which is assigned to the at least one user.

In one particular embodiment, for each record in the encrypted form of the database performing, the method further includes:
  generating a key that is derived from at least the index of the record and the access-control attributes and a secret key of the database server; and
  encrypting the record with the key.

BRIEF DESCRIPTION OF THE DRAWINGS

FIG. 5: Is a description of a database setup algorithm in accordance with the present disclosure;

FIG. 7: Is a description of an Issue protocol in accordance with one embodiment the present disclosure;

DETAILED DESCRIPTION

Construction Overview

Figure 1:
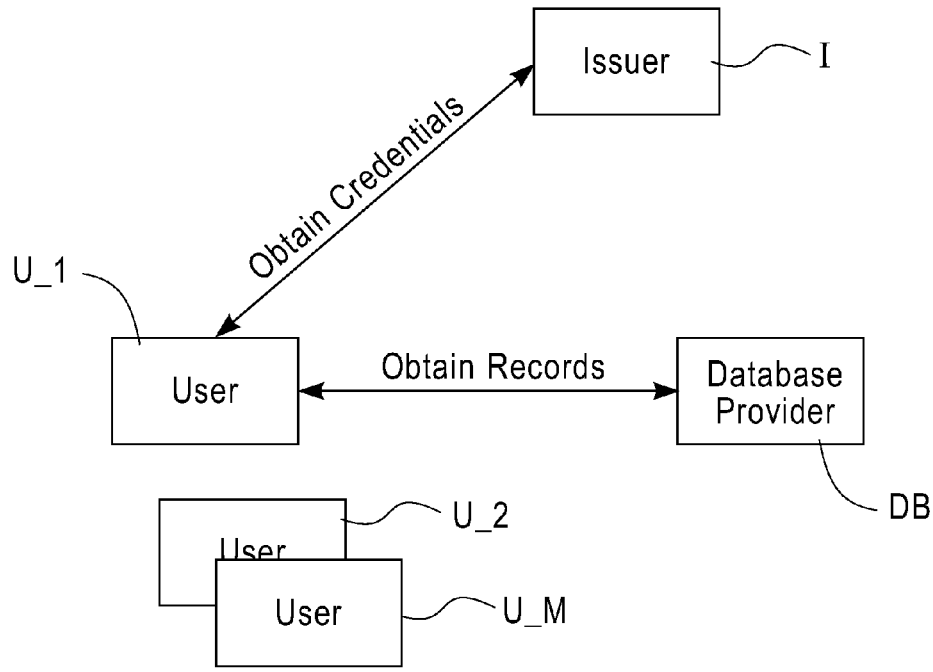
FIG. 1: Is a block diagram illustrating a system in accordance with one embodiment of the present disclosure.

The preferred embodiment of the invention builds upon the oblivious transfer protocol described in Camenisch, Neven, and Shelat ("Simulatable adaptive oblivious transfer", EUROCRYPT 2007, vol. 4515 of LNCS, pp. 573-590, Springer Verlag, 2007) which will be described first. In their scheme, the server first encrypts each record with a unique key and publishes these encryptions. The encryption key is derived from the index of the record and a secret of the database server. Although the secret of the database is the same for all record keys, it is not possible to derive the encryption key for one record from that of another record. Thus, to be able to access a record, a user needs to retrieve the corresponding key from the server. To this end, Camenisch et al. give a protocol ensuring that 1) the user can retrieve exactly one key per protocol run and 2) the server does not learn which key the user obtained.

For the preferred embodiment of the invention, anonymous credentials are issued first to a user, each certifying a category of records the user is allowed to access. Anonymous credentials allow the user to later prove that she possesses a credential without revealing any other information whatsoever. The name "category" is inspired by the different data categories that a user is allowed to access. However, the category could just as well encode the right, role, or attribute that a user needs to have in order to access a record. In the following only the word category will be used, however. If a record has several categories attached to it, then the user must have a credential for all these categories, basically implementing an AND condition. If one would want to specify an OR condition, one could duplicate the record in the database with a second set of categories.

To allow the user oblivious access to a record for which she has the necessary credentials, the oblivious transfer protocol from Camenisch et al. cited above is extended in two ways: 1) The keys for a record are derived not only from the index of the record and the secret key of the server but also from the categories of the record; 2) The protocol is extended so that the user, while retrieving a key, gives a zero-knowledge proof of knowledge that she possesses credentials on all the categories that are encoded into the key that she wants to retrieve. Using anonymous credentials and the specific features of the protocol from Camenisch et al., this can be achieved without letting the server to neither learn the categories nor any other information about the key which the user obtains through the protocol.

Related Work

There is a large body of works on oblivious transfer which per se offers users access to a database without the server learning the contents of the query. In its basic form, oblivious transfer puts no restrictions on which records a particular user can access, i.e., all users can access all records. There are a couple of papers that consider oblivious transfer with access control.

For example, Aiello, Ishai, and Reingold ("Priced oblivious transfer: How to sell digital goods", EUROCRYPT 2001, vol. 2045 of LCNS, pp. 119-135, Springer-Verlag, 2001) present priced oblivious transfer. Here, each record has attached a (possibly different) price. The user holds a (homomorphically) encrypted balance which is reduced with each transfer. Thus, the user can only retrieve records as long as her balance is positive.

Another related flavour is conditional oblivious transfer, proposed by Di Crescenzo, Ostrovsky, and Rajagopalan ("Conditional oblivious transfer and timed-release encryption", EUROCRYPT '99, vol. 1592 of LNCS, pp. 74-89, Springer-Verlag, 1999), where access to a record is only granted if the user's secret satisfies some given predicate. However, none of these protocols offer anonymity to the users.

Herranz ("Restricted adaptive oblivious transfer", Cryptology ePrint Archive, Report 2008/182, 2008, http://eprint.iacr.org) proposes restricted oblivious transfer, which also protects each record with an access control policy. In his case the policy consists of a list saying which user has access to which record, and the user authenticates to the server openly. In contrast, our protocol employs a more powerful attribute-based access control paradigm, and guarantees user anonymity.

Anonymous access control while hiding the query from the server is described in Coull, Green, and Hohenberger, "Controlling Access to an Oblivious Database using Stateful Anonymous Credentials", Proc. of the 12th International Conference on Practice and Theory in Public Key Cryptography: PKC '09, pp. 501-520. There a scheme for controlling the access to records by defining the policies using state graphs is described. With each access a user transitions from one state to another, where the transition is defined by the index of the record the user has accessed. By restricting the possible transitions between states a user being in a particular state can only access the records corresponding to the possible transitions. With this approach it is for instance possible to model work flow processes on data bases or to implement Bell-LaPadula access control schemes. One could try to implement our primitive using theirs for a fixed access control policy and a fixed set of users by defining a separate state for each user listing all records that that particular user is allowed to access. Not only would this be rather inefficient (the server would have to publish information linear in the product of the number of users and the number of records), but on top of that one would lose the flexibility of truly attribute-based access control.

Overview of Oblivious Transfer with Access Control

FIG. 1 illustrates the basic setup for an oblivious transfer protocol with access control, which is run between the following parties:

users (U_1, ..., U_M) known by pseudonyms;

an issuer I providing access credentials in form of access control lists (ACLS) to users for the data categories that they are entitled to access;

a database server DB hosting the list of records and giving users access to those records that they are entitled to access.

Figure 2:
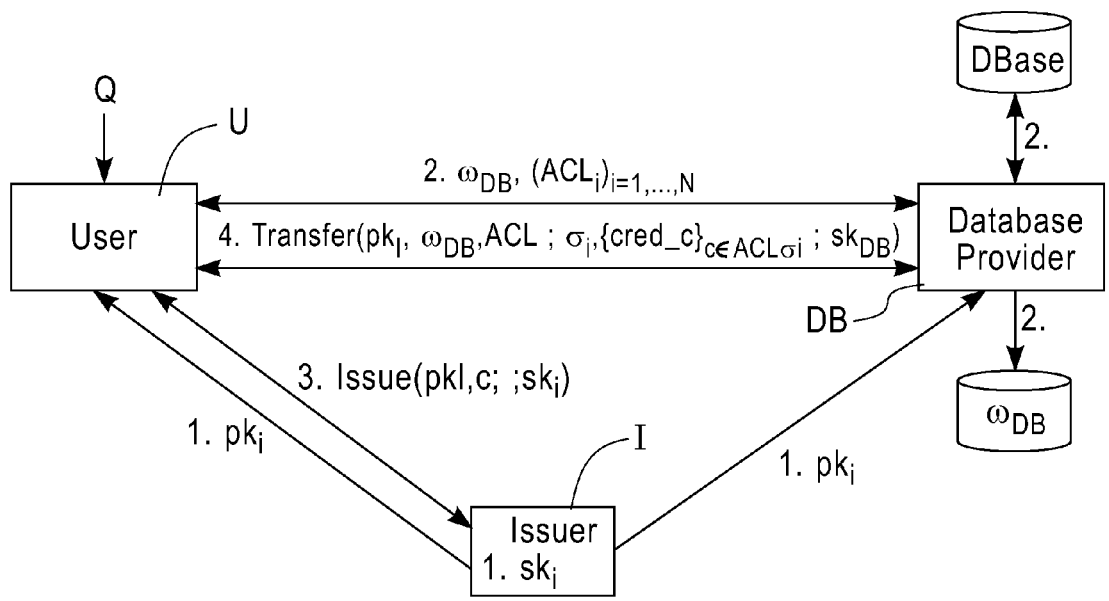
FIG. 2: Is a combined block and flow diagram illustrating a system and method in accordance with the present disclosure.

As shown in FIG. 2, an oblivious transfer protocol with access control works as follows:

Step 1: The issuer I generates his key pair $pk_I$ and $sk_I$ for issuing credentials and publishes the public key $pk_I$ as a system-wide parameter.

Step 2: The database server DB initiates a database DBase containing records protected by access control lists $ACL_1, \ldots, ACL_N$, generates the encrypted database $\omega_{DB}$ and makes it and the access control lists available to all users, e.g. by posting it on a website.

Step 3: A user U contacts the issuer I to obtain the credentials c for the data categories that they want or are entitled to access. The issuer I responds to this request by performing an Issue function with the parameters ($pk_I$, c; ;$sk_I$).

Step 4: When the user U wants to access a record with index $\sigma_i$ in the database $\omega_{DB}$ after it received a corresponding query Q, she proves to the database server DB, in a zero-knowledge way, that she possesses credentials for all categories ($\{cred\_c\}c\in ACL\sigma i$) associated with this record $\sigma_i$. If the user succeeds then she can decrypt that record $\sigma_i$, otherwise, she cannot. The database server DB learns nothing about the index o of the record that is being accessed, or about the categories $\{cred\_c\}_{c\in ACL\sigma i}$ associated to the record.

All communication links are assumed to be private. Further, the communication links between the users $U\_1, \ldots, U\_M$ and the issuer I are authenticated, so that the issuer I always knows which user it is handing a credential to. The communication links between a user and the database server DB are assumed to be anonymous however, so that the database server DB does not know which user is making a record query. While authenticated links do mean that the database server DB knows which user $U\_1, \ldots, U\_M$ is making a query, it still does not know which record that user $U\_1, \ldots, U\_M$ is querying, or which credential the user has.

Theoretical Preliminaries

If $\kappa \in \mathbb{N}$, then $1^\kappa$ is the string consisting of $\kappa$ ones. The empty string is denoted $\epsilon$. If A is a randomized algorithm, then $$y \xleftarrow{\$} A(x)$$

denotes the assignment to y of the output of A on input x when run with fresh random coins. Unless noted, all algorithms are probabilistic polynomial-time (PPT) and it is implicitly assumed that they take an extra parameter $1^\kappa$ in their input, where $\kappa$ is a security parameter. A function $v:\mathbb{N} \to [0,1]$ is negligible if for all $c\in\mathbb{N}$, there exists a $\kappa_c\in\mathbb{N}$, such that $v(\kappa) < \kappa^{-c}$ for all $\kappa > \kappa_c$.

Let $Pg(1^\kappa)$ be a pairing group generator that on input $1^\kappa$ outputs descriptions of multiplicative groups $g_1$, $g_T$ of prime order p where $|p|>\kappa$. Let $Pg(1^\kappa)$ be a pairing group generator that on input p outputs descriptions of multiplicative groups $g_1$, $g_T$ of prime order p. Let $g_1^* = g_T \setminus \{1\}$ and let $g \in g^*_1$. The generated groups are such that there exists an admissible bilinear map e: $g_1 \times g_1 \to g_T$, meaning that (1) for all a,b $\in \mathbb{Z}_p$ it holds that $e(g^a, g^b) = e(g,g)^{ab}$; (2) $e(g,g) \neq 1$; and (3) the bilinear map is efficiently computable.

Definition: We say that the 1-power decision Diffie-Hellman 1-PDDH) assumption [see J. Camenisch, G. Neven, and Abhi Shelat "Simulatable adaptive oblivious transfer", Proc. of EUROCRYPT 2007, vol. 4515 of LNCS, pp. 573-590, Springer Verlag 2007] holds in groups $\Gamma, \Gamma_T$ if for all polynomial-time adversaries A the advantage $Adv_{\Gamma,\Gamma_T}^{PDDH}(\kappa)$ is given by $$Pr[A(g, g^\alpha, \ldots, g^{\alpha^l}, H, H^\alpha, \ldots, H^{\alpha^l}) = 1] - Pr[A(g, g^\alpha, \ldots, g^{\alpha^l}, H_0, \ldots, H_l) = 1]$$

is a negligible function in $\kappa$, where $$g \xleftarrow{\$} \Gamma^*, H_0, \ldots, H_l \xleftarrow{\$} \Gamma_T^*$$

and $$\alpha \xleftarrow{\$} \mathbb{Z}_p.$$

Definition: We say that the 1-strong Diffie-Hellman (1-SDH) assumption holds in group $\Gamma_1$ of order $p>2^\kappa$ if for all polynomial-time adversaries A the advantage $$Adv_{\Gamma_1}^{SDH}(\kappa) = Pr\left[A(g, g^x, \ldots, g^{x^l}) = \left(c, g^{\frac{1}{x+c}}\right)\right]$$

is a negligible function in $\kappa$, where Pr is the probability, $$g \xleftarrow{\$} \Gamma_1^*$$

and $$x, c \xleftarrow{\$} \mathbb{Z}_p.$$

The following modification of the weakly-secure signature scheme from D. Boneh and X. Boyen "Short signatures without random oracles", Proc. of EUROCRYPT 2004, vol. 3027 of LNCS, pp. 56-73, Spinger Verlag 2004, is used. The scheme uses a pairing generator Pg as defined above. The signer's secret key is $$(x_m, x_1, \ldots, x_l) \xleftarrow{\$} \mathbb{Z}_p,$$

the corresponding public key is $(g, y_m = g^{x_m}, y_1 = g^{x_1}, \ldots, y_l = g^{x_l})$ where g is a random of $g_1$. The signature on the tuple of messages $(m, c_1, \ldots, c_l)$ is $$s \leftarrow g^{\frac{1}{x_m + m + x_1 c_1 + \ldots + x_l c_l}};$$

verification is done by checking whether $e(s, y_m \cdot g^m \cdot y_1^{c_1} \cdot \ldots \cdot y_l^{c_l}) = e(g,g)$ is true.

Security against weak chosen message attacks is defined through the following game. An adversary begins by outputting N tuples of messages $((m_1, c_{1,1}, \ldots, c_{1,l}), \ldots, (m_N, c_{N,1}, \ldots, c_{N,l}))$. A challenger then generates the key pair and gives the public key to the adversary, together with signatures $s_1, \ldots, s_N$ on the message tuples. The adversary wins if it succeeds in outputting a valid signature s on a tuple (m, $c_1, \ldots, c_l) \notin \{(m_1, c_{1,1}, \ldots, c_{1,l}) \ldots (m_N, c_{N,1}, \ldots, c_{N,l})\}$. This scheme is said to be unforgeable under weak chosen-message attack if no PPT adversary has non-negligible probability of winning this game. An adaptation of the proof by Boneh and Boyen can be used to show that this scheme is unforgeable under weak chosen message attack if the (N+1)-SDH assumption holds.

Definitions from the following articles are used in the following: M. H. Au, W. Susilo, and Y. Mu "Constant-size dynamic k-TAA", Proc. of SCN 06, vol. 4116 of LNCS, pp. 111-125, Springer Verlag 2006; and R. Cramer, I. Damgård, and P. D. MacKenzie "Efficient zero-knowledge proofs of knowledge without intractability assumptions", Proc. of PKC 2000, vol. 1751 of LNCS, pp. 354-372, Springer Verlag 2000. A pair of interacting algorithms (P,V) is a proof of knowledge (PoK) for a relation $R=\{(\alpha,\beta)\} \subseteq \{0,1\}^* \times \{0,1\}^*$ with knowledge error $\kappa \in [0,1]$ if (1) for all $\overline{(\alpha,\beta)} \in R$, $V(\alpha)$ accepts a conversation with $P(\beta)$ with probability 1; and (2) there exists an expected polynomial-time algorithm E, called the knowledge extractor, such that if a cheating prover $\hat{P}$ has probability $\epsilon$ of convincing V to accept $\alpha$, then E, with a given rewindable black-box access to $\hat{P}$, outputs a witness $\beta$ for with probability $\epsilon - \kappa$.

A proof system (P,V) is perfect zero-knowledge if there exists a PPT algorithm Sim, called the simulator, such that for any polynomial-time cheating verifier $\hat{V}$ and for any $(\alpha,\beta) \in R$, the output of $\hat{V}(\alpha)$ after interacting with $P(\beta)$ and the output of $Sim^{\hat{V}(\alpha)}(\alpha)$ are identically distributed. A $\Sigma$-protocol is a proof system (P,V) where the conversation is of the form (a,c,z), where a and z are computed by P, and c is a challenge chosen at random by V. The verifier accepts if $\phi(\alpha,a,c,z)=1$ for some efficiently computable predicate $\phi$. Given two accepting conversations (a,c,z) and (a,c',z') for $c \neq c'$, one can efficiently compute a witness $\beta$. Moreover there exists a polynomial-time simulator Sim that on input $\alpha$ and a random string c outputs an accepting conversation (a,c,z) for $\alpha$ that is perfectly indistinguishable from a real conversation between $P(\beta)$ and $V(\alpha)$.

For a relation $R=\{(\alpha,\beta)\}$ with $\Sigma$-protocol (P,V), the commitment relation $R'=\{(\alpha,a),(c,z)\}$ holds if $\phi(\alpha,a,c,z)=1$. If both R and R' have $\Sigma$-protocols, then Cramer et al. cited above show how to construct a four-move perfect zero-knowledge PoK for R with knowledge error $$\kappa = \frac{1}{|C|},$$

where C is the space from which the challenge c is drawn.

In the common parameters model, several previously known results for proving statements about discrete logarithms are used, such as (1) proof of knowledge of a discrete logarithm modulo a prime [see C. P. Schnorr "Efficient signature generation for smart cards", Journal of Cryptology, 4(3):239-252, 1991], (2) proof of knowledge of equality of (elements of) representations [see D. Chaum and T. P. Pedersen "Wallet databases with observers", Proc. of CRYPTO '92, vol. 740 of LNCS, pp. 89-105, Springer Verlag 1993], (3) proof that a commitment opens to the product of two other committed values [see S. Brands "Rapid demonstration of linear relations connected by Boolean operators", Proc. of EUROCRYPT '97, vol. 1233 of LNCS, pp. 318-333, Springer Verlag 1997; J. Camenisch, M. Michels "Proving in zero-knowledge that a number n is the product of two safe primes", Proc. of EUROCRYPTT '99, vol. 1592 of LNCS, Springer Verlag 1999; J. Camenisch "Group Signature Schemes and Payment Systems Based on the Discrete Logarithm Problem", PhD Thesis, ETH Zurich, 1998], and also (4) proof of the disjunction or conjunction of any two of the previous [see R. Cramer, I. Damgård, B. Schoenmakers "Proofs of partial knowledge and simplified design of witness hiding protocols", Proc. of CRYPTO '94, vol. 839 of LNCS, pp. 174-187, Springer Verlag 1994].

When referring to the proofs above, the notation introduced by Camenisch and Stadler ["Efficient group signature schemes for large groups", Proc. of '97, vol. 1296 of LNCS, pp. 410-424, Springer Verlag 1997] will be followed for various proofs of the validity of statements about discrete logarithms. For instance, $PK\{(a,b,c):y=g^a h^b \land \tilde{y}=\tilde{y}^a h^c\}$ denotes a "zero-knowledge Proof of Knowledge of integers a,b,c such that $y=g^a h^b$ and $\tilde{y}=\tilde{g}^a \tilde{h}^c$ holds," where $y,g,h,\tilde{y},\tilde{g},\tilde{h}$ are elements of some groups $G=\langle g \rangle=\langle h \rangle$ and $\tilde{G}=\langle \tilde{g} \langle = \rangle \tilde{h} \rangle$. The convention is that the letters in the parenthesis denote quantities of which knowledge is being proven, while all other values are known to the verifier. The Fiat-Shamir heuristic [A. Fiat and A. Shamir "How to prove yourself; Practical solutions to identification and signature problems", Proc. of CRYPTO '86, vol. 263 of LNCS, pp. 186-194, Springer Verlag 1987] is applied to turn such proofs of knowledge into signatures on some message m; denoted as, e.g., $SPK\{(a):y=g^\alpha\}(m)$.

Given a protocol in this notation, it is straightforward to derive an actual protocol implementing the proof [see the PhD Thesis of Camenish cited above and J. Camenisch, A. Kiayias, M. Yung "On the portability of generalized schnorr proofs", Proc. of EUROCRYPT 2009, LNCS, Springer Verlag 2009]. Indeed, the computational complexities of the proof protocol can be easily derived from this notation: basically for each term $y=g^a h^b$, the prover and the verifier have to perform an equivalent computation, and to transmit one group element and one response value for each exponent.

The signature scheme proposed and proved secure by Au et al. [M. H. Au, W. Susilo, and Y. Mu "Constant-size dynamic k-TAA", Proc. of SCN 06, vol. 4116 of LNCS, pp. 111-125, Springer Verlag 2006] is used, which is based on the schemes of Camenisch and Lysyankaya [J. Camenisch, A. Lysyanskaya "Signature schemes and anonymous credentials from bilinear maps", Proc. of CRYPTO 2004, vol. 3152 of LNCS, pp. 56-72, Springer Verlag 1999] and of Boneh et al. [D. Boneh, X. Boyen, h. Shacham "Short group signatures", Proc. of CRYPTO 2004, vol. 3152 of LNCS, Springer Verlag 2004]. It assumes cyclic groups $\Gamma$ and $\Gamma_T$ of order p and a bilinear map $e:\Gamma \times \Gamma \to \Gamma_T$. The signer's secret key is a random element $$x \xleftarrow{\$} \mathbb{Z}_q.$$

The public key contains a number of random bases $$g_1, h_0, \ldots, h_l, h_{l+1} \xleftarrow{\$} \Gamma$$

where $l \in \mathbb{N}$, is a parameter, and $y \leftarrow g_1^x$.

A signature on messages $m_0, \ldots, m_l \in \mathbb{Z}_p$ is a tuple (A,r,s) where $$r, s \xleftarrow{\$} \mathbb{Z}_p$$

are values chosen at random by the signer and $$A = (g_1 h_0^{m_0} \ldots h_l^{m_l} h_{l+1}^r)^{\frac{1}{x+s}}.$$

Such a signature can be verified by checking whether $e(A, g_1^s y) = e(g_1 h_0^{m_0} \ldots h_l^{m_l} h_{l+1}^r, g_1)$.

Now it is assumed that a signature $(A,r,s)$ is given on messages $m_0, \ldots, m_l \in \mathbb{Z}_F$ and that it will be proved if indeed such a signature is possessed. The public key needs to be augmented with values $u,v \in \Gamma$ such that $\log_{g_1} u$ and $\log_{g_1} v$ are not known. This can be done as follows:

Choose random values $$t, t' \xleftarrow{\$} \mathbb{Z}_p$$

and compute $\tilde{A} = Au^t$, $B = v^t u^{t'}$;

Execute the following proof of knowledge $$PK\left\{(\alpha, \beta, s, t, t', m_0, \ldots, m_l, r): B = v^t u^{t'} \land 1 = B^{-s} v^\alpha u^\beta \frac{e(\tilde{A}, y)}{e(g_1, g_1)} = \frac{1}{e(\tilde{A}, g_1)^s} e(u, y)^t e(u, g_1)^\alpha e(h_{l+1}, g_1)^r \prod_{i=0}^{l} e(h_i, g_1)^{m_i}\right\}$$

where $\alpha = st$ and $\beta = st'$.

It was proved by Au et al. cited above that the above signature is unforgeable under adaptively chosen message attack if q-SDH assumption holds, where q is the number of signature queries, and that the associated PoK is perfect honest-verifier zero knowledge.

Implementation

Data categories are bit strings taken from the universe $C \subset \{0,1\}^*$. The database server DB maintains the database $\overline{\text{DBase}}$ in form of a list on N couples $((R_1, ACL_1), \ldots, (R_N, ACL_N))$, containing the database records $R_1, \ldots, R_N \in \{0,1\}$ and associated access control lists $ACL_1, \ldots, ACL_N \subset C$. An access control list is a tuple of exactly l categories: $\overline{ACL_i} = (c_{i1}, \ldots, c_{il}) \in C^l$. A database record can therefore be associated with at most l categories; unused entries are filled with a dummy category $c_{ij} = \text{dummy}$ for which it is assumed that every user is given a credential for free. The semantics of the access control lists is that only users who have credentials for all data categories in an access control list $ACL_i$ can access the associated record $R_i$. In other words, the access control list is a conjunction of keywords; disjunctions can be realized by letting the same record appear multiple times in the database. Finally, users interact with the database server DB directly to obtain those records that they are entitled to receive.

An adaptive oblivious transfer protocol according to the present disclosure includes the following functions and protocols: ISetup, Issue, DBSetup, and Transfer. In order to set up its keys, the issuer I runs the randomized ISetup function shown in FIG. 3 to generate groups of prime order p, a public key $pk_I$ and a corresponding secret key $sk_1$ for a security parameter $\kappa$ and publishes the public key $pk_1$ as a system-wide parameter.

Figures 3, 4:
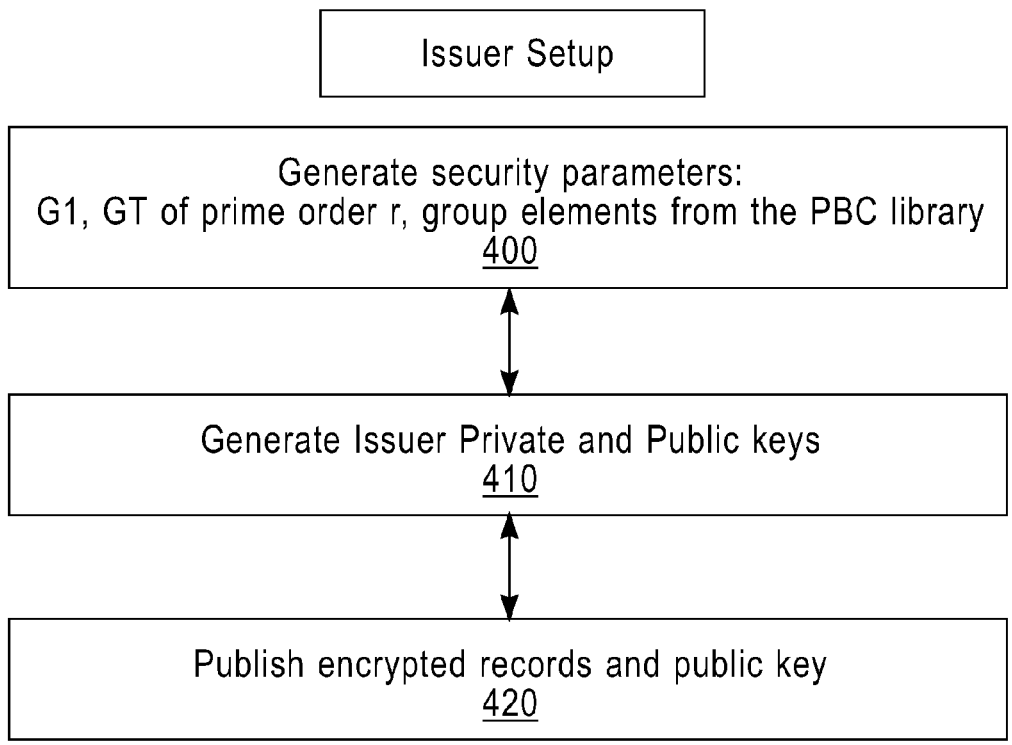
FIG. 3: Is a description of a setup procedure of an issuer in accordance with the present disclosure.
FIG. 4: Is a flow diagram illustrating the setup procedure from FIG. 3.

The ISetup function can be implemented using the PBC library, which is a free portable C library allowing the rapid prototyping of pairing-based cryptosystems. It provides an abstract interface to a cyclic group with a bilinear pairing, insulating the programmer from mathematical details. FIG. 4 illustrates the implementation. In step 400 the security parameters are generated, especially the groups of prime order. Then in step 410 the private and public keys of the issuer are generated, and in step 420 the encrypted records and the public key are published. The following code fragment provides an example implementation for step 410 using the PBC library:

```
//generate system parameters
  element_init_G1(g1, pairing); element_random(g1);
  element_init_G1(h0, pairing); element_random(h0);
  element_init_G1(h1, pairing); element_random(h1);
  element_init_G1(h2, pairing); element_random(h2);
  element_init_G1(u, pairing); element_random(u);
  element_init_G1(v, pairing); element_random(v);
  element_init_G1(w, pairing); element_random(w);
  element_init_GT(gT, pairing); element_random(gT);
  element_init_GT(hT, pairing); element_random(hT);
//generate private key skI
  element_init_Zr(xI, pairing); element_random(xI);
  element_pow_zn(yI, g1, xI); //compute yI
  pkI[ ] = (g1,h0,h1,h2,u,v,w,gT,gT); // Issuer's Public key
  skI = xI; // Issuer's Secret key
```

To initiate the database DBase containing the records $R_1, \ldots, R_N$ protected by the access control lists $ACL_1, \ldots, ACL_N$, the database server DB runs the DBSetup algorithm. This generates the encrypted database $\omega_{DB}$ consisting of a public key $pk_{DB}$ and encrypted records $ER_1, \ldots, ER_N$. The encrypted database $\omega_{DB}$ is made available to all users, e.g. by posting it on a website. It is assumed that each user obtains a copy of the entire encrypted database. The database server DB keeps the secret key $sk_{DB}$ to the database for itself.

To set up the database $\omega_{DB}$, the database server DB performs the algorithm shown in FIG. 5. First, the database server DB chooses its secret key $x_{DB}$. Next it encrypts each database record $R_i$ as $(E_i, F_i)$, each with its own key. These keys not only depend on the secret key $x_{DB}$, but also on the index i of the record $R_i$ and the categories defined in the access control policy for the record $$\left(\{x_c\}_{c \in \cup_{i=1}^N ACL_i}\right).$$

The pairs $(E_i, F_i)$ can be seen as an ElGamal encryption [see T. ElGamal "A public key cryptosystem and a signature scheme based on discrete logarithms", IEEE Transactions on Information Theory, 31(4), pp. 469-472, 1985] in $\overline{G}_T$ of $R_i$ under the public key H. But instead of using random elements from $\overline{G}_T$ as the first component, our protocol uses verifiably random [see Y. Dodis, A. Yampolskiy "A verifiable random function with short proofs and keys", Proc. of PKC 2005, vol. 3386 of LNCS, pp. 416-431] values $$E_i = g^{\frac{1}{x_{DB} + i + \sum_{j=1}^{l} x_j \cdot c_{ij}}}.$$

It is this verifiability that allows the database to check during the transfer phase that the user is indeed asking for the decryption key for one particular record with a particular access control protocol for which user has appropriate credentials.

Figure 6:
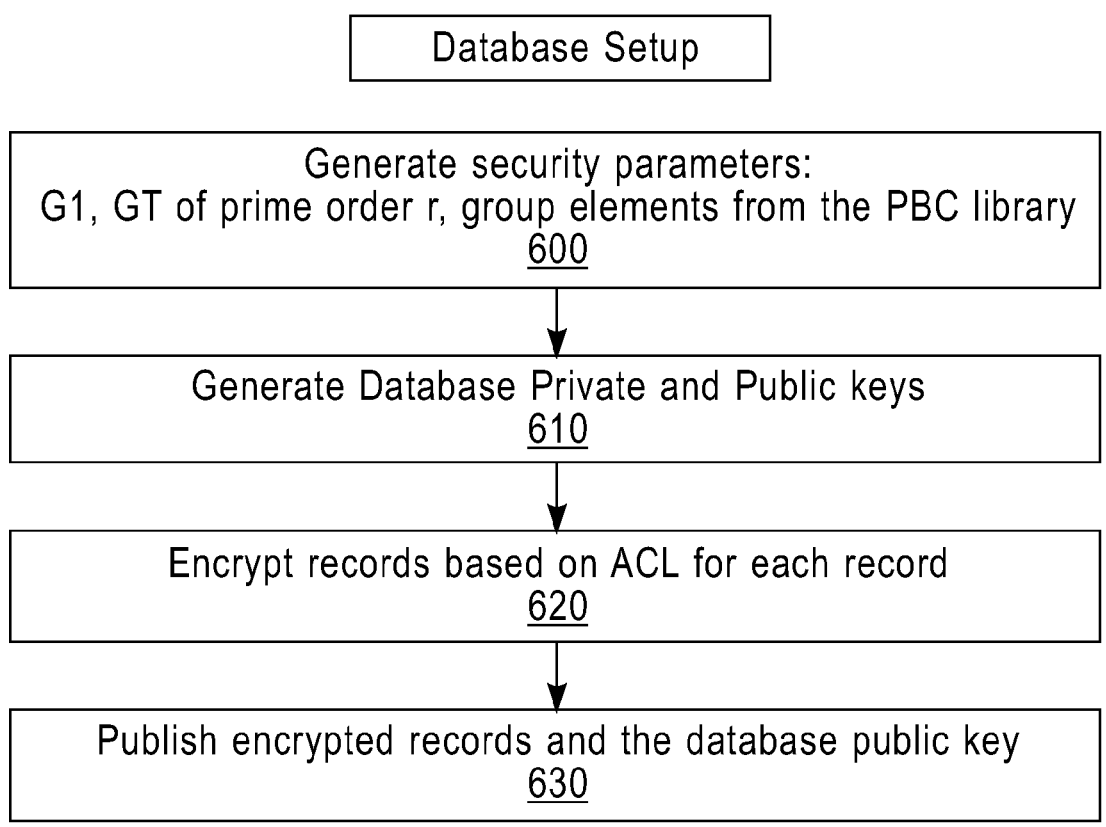
FIG. 6: Is a flow diagram illustrating the database setup algorithm from FIG. 5.

FIG. 6 illustrates the implementation of the database setup algorithm. In step 600 the security parameter are generated using the PBC library. Then in step 610 the public and private keys are generated for the database and in step 620 the records of the database records are encrypted based on the access control lists. Finally, the encrypted records and the public key of the database are published in step 630.

The following code fragment shows an example implementation for Step 600:

```
//generate system parameters
element_init_G1(h, pairing); element_random(h);
pairing_pp_t ppg; pairing_pp_init(ppg, g, pairing);
pairing_pp_t pph; pairing_pp_init(pph, h, pairing);
pairing_pp_apply(H, h, ppg);
An example implementation for step 610 is given by the following
code fragement:
//generate private and public keys:
element_init_Zr(xDB, pairing); element_random(xDB);
element_pow_zn(yDB, g, xDB);
For i=1 to l
{
element_init_Zr(x[i], pairing); element_random(x[i]);
element_pow_zn(y[i], g, x[i]);
}
Database's Public key pkDB = (g,H,yDB, y[ ]);
Database's Secret key skDB = (h, xDB, x[ ]);
Step 620 can be implemented using the following code fragment:
//encrypt records (R[ ], ACL=c [ ][ ])
For i=1 to N
{
for j=1 to l {xC[i]=x[j]*c[i][j];}
element_pow_zn(E[i], g, xDB+i+xC[i]);
pairing_pp_apply(T[i], E[i], pph);
F[i] = T[i]*R[i]
}
```

A user U obtains an access credential for a data category $c \in C$ by engaging in the Issue protocol shown in FIG. 7 with the issuer I. The issuer's I public key $pk_I$ and the data category c are common inputs. The issuer I uses his secret key $sk_I$ as an input and the user U possibly maintains his state $st_U$. At the end of the protocol, the user U obtains the access credential $cred_c$ and the updated state $st_U'$.

To be able to make database queries, a user needs to obtain the credentials for the categories she is allowed to access. To this end, the user runs an Issue protocol with the issuer. It is assumed that the communication links are authenticated so that the issuer I knows which user it is talking to. Apart from the public key of the Issuer I, the user's input also includes her state $st_U = (z_U, P, f_{DB}, \{c_U\}, \{cred_{C_U}\})$, which is a tuple containing her master secret $z_U$, her pseudonym P, a bit $f_{DB}$ indicating whether she already accessed the database, and the category $c_U$ that she wants to obtain a credential $cred_{C_U}$ for. The input of the issuer I contains his secret and public key, the category for which the users wants a credential, and, if the user runs the protocol not for the first time, also the pseudonym P of the user.

If the user runs the issuing protocol for the first time, her input will contain the empty state, i.e., $st_u = \bot$. In this case, the user first generates her master secret $z_U$ and calculates her pseudonym $P = h_0^{z_U}$, sends the pseudonym P to the issuer I and then initializes her state $st_U = (z_U, P, 0, \emptyset, \emptyset)$ with the master secret, the pseudonym, the bit $f_{DB}=0$ and an empty category and an empty credential.

As a result of the issuing protocol, the user will obtain (access) credentials for the category $c \in C$. This credential is a tuple $cred_c = (A_c, s_c, r_c)$, which can be verified by checking $e(A_c, g_1^{s_c} y_I) = e(g_1 Ph_1^c h_2^{r_c}, g_1)$. It is assumed that the user and the issuer I run the issuing protocol for each category for which the user is allowed to obtain a credential individually. It is not hard to see how to issue the credentials for all of the user's categories at once. A credential $(A_c, s_c, r_c)$ is a signature on the set of messages $(z_U, c)$, where $z_U$ is a "secret message" known to the user only (i.e., user's master secret).

Figure 8:
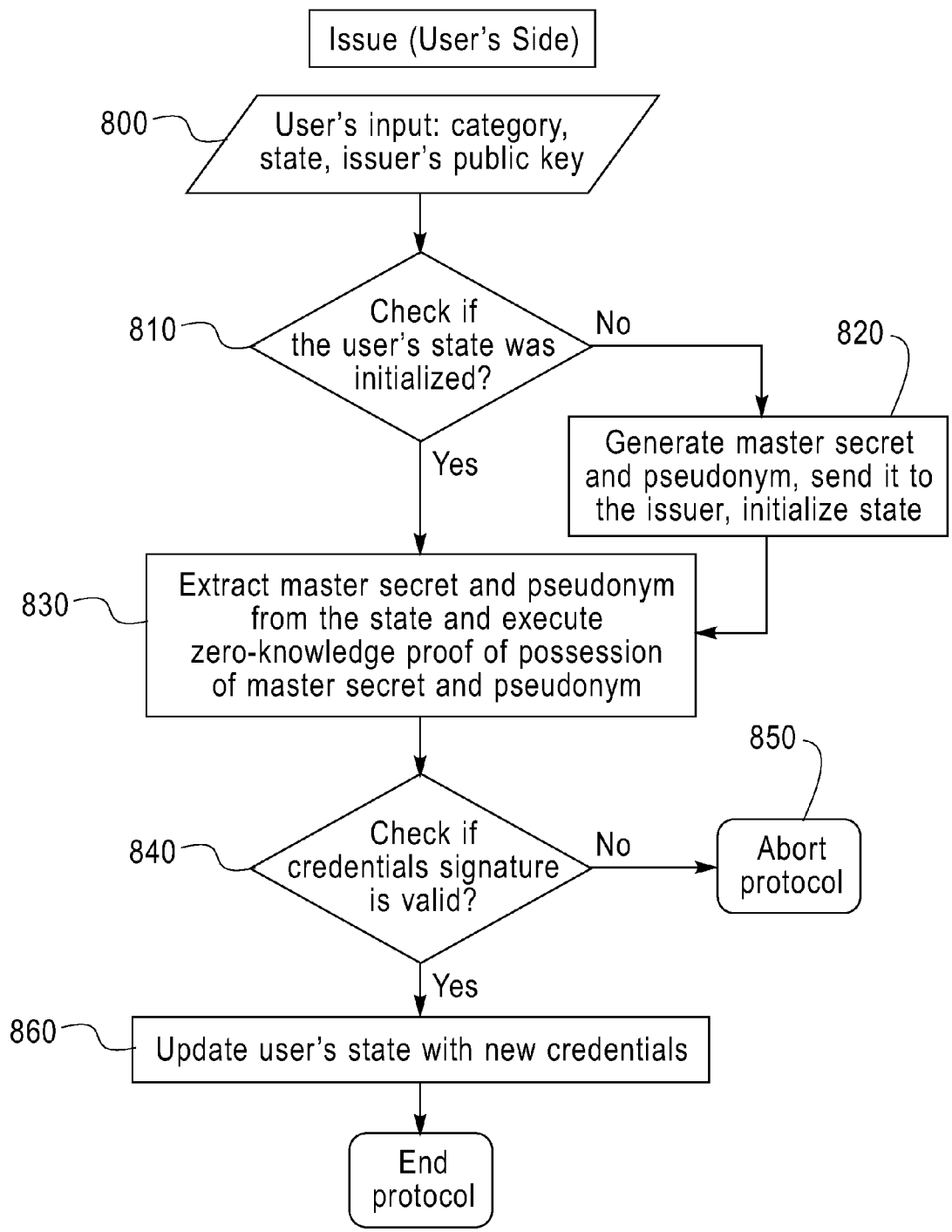
FIG. 8: Is a flow diagram illustrating the user's side of the Issue protocol of FIG. 7.

FIG. 8 illustrates the user's side of the implementation of the Issue protocol. In step 800 the category, state and the public key of the Issuer are obtained. In step 810 it will be checked if the state of the user was already initialized. If that was not the case, then the master secret and the pseudonym will be generated in step 820, used for the state initialization and send to the Issuer I. If the state is initialized, then in step 830 the master secret and the pseudonym will be extracted from the state and a zero-knowledge PoK will be performed to determine if the user is in the possession of the master secret and the pseudonym. Then in step 840 it will be checked if the signature of the credentials is valid. If that is not the case, then the protocol aborts in step 850. Otherwise the state of the user will be updated with the new credentials in step 860.

Figure 9:
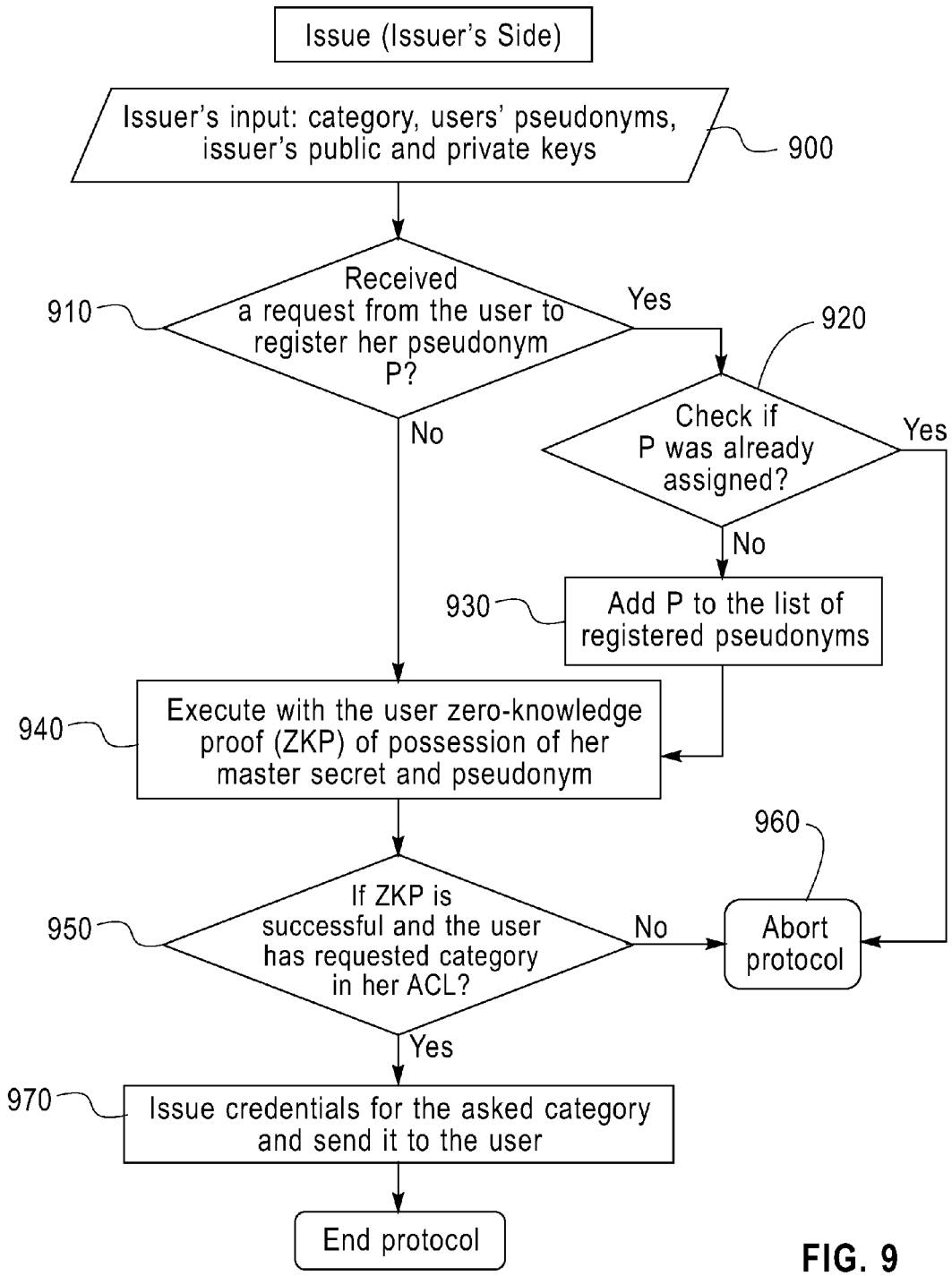
FIG. 9: Is a flow diagram illustrating the issuer's side of the Issue protocol of FIG. 7.

FIG. 9 illustrates the side of the Issuer I of the Issue protocol. In step 900 the category data, the pseudonyms of the users and the public and private key of the Issuer I are obtained. In step 910 it will be determined if the Issuer I received a request from a user to register her pseudonym. If that is the case, then it will be checked in step 920 if the pseudonym was already assigned, otherwise step 940 is performed. If so, then the Issue protocol will be aborted in step 960. Otherwise the pseudonym will be added to the list of registered pseudonyms in step 930. Then in step 940 the zero knowledge proof of possession of master secret and pseudonym is performed with the user. In step 950 it will be determined if the zero knowledge proof was successful and the user has the requested category in her access control list. If this is not the case, then the Issue protocol will be aborted in step 960. Otherwise, the Issuer I is providing the credentials for the asked category and sends it to the user.

Figure 10:
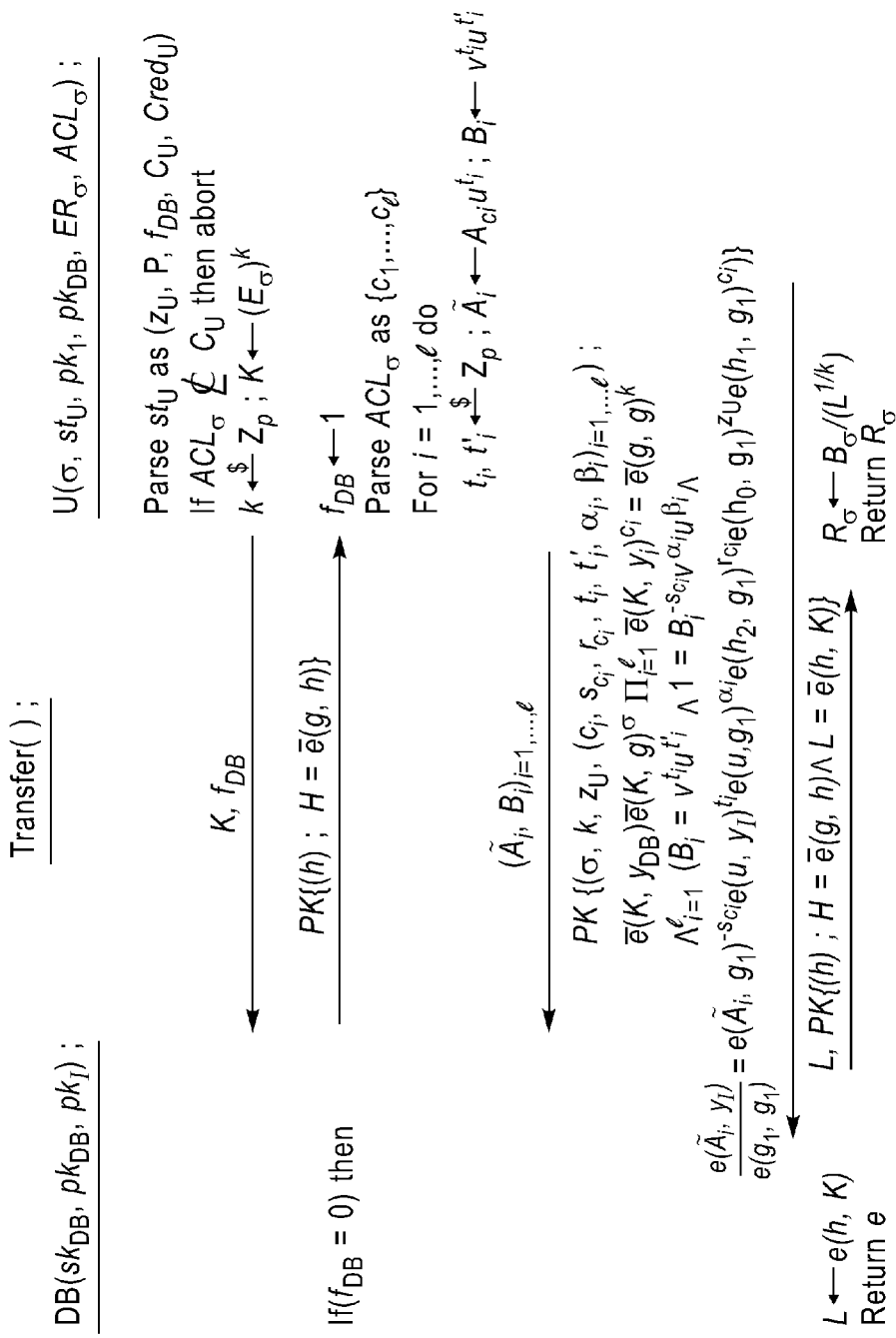
FIG. 10: Is a description of a Transfer protocol in accordance with one embodiment of the present disclosure.

When the user U wants to access a record in the database, she engages in a Transfer protocol with the database server DB as shown in FIG. 10. Common inputs are the issuer's I public key $pk_I$ and the public key $pk_{DB}$ of the database server DB. The user U has as a secret input her selection index $\sigma \in \{1, \ldots, N\}$ of the record $R_\sigma$ that she wants to access, the encryption $ER_\sigma = (E_\sigma, F^\sigma)$ of that record, the access control policy $ACL_\sigma$ of the record, the required credentials $cred_c$ for all $c \in ACL_\sigma$, and possibly state information $st_U$. At the end of the protocol, the user obtains the database record $R_\sigma$ or a failure indicator $\bot$, and updated state information $st_U'$. The input of the database server DB is its secret key $sk_{DB}$ and public key $pk_{DB}$ as well as the public key $pk_I$ of the issuer I.

If this is the first transfer protocol which the users executes with the database server DB (i.e. $f_{DB}=0$), then the user asks the database server DB to execute a proof of knowledge of the database secret key h. This zero-knowledge proof will enable to decrypt the contents of the database in the security proof. Then the user randomizes the encrypted record $E_\sigma$, and sends this randomized version K to the database server DB. This randomized version is therefore derived from the secret key $x_{DB}$ of the database server DB, the index $\sigma$ of the record $R_\sigma$, and, most importantly all the categories of the record $R_\sigma$. Next, the user proves that K is correctly formed as a randomization of some $E_i$ for which she possesses all necessary credentials. If the database server DB accepts the proof, it computes L from h and K, sends L to the user, and proves that L was computed correctly. The protocol is easily seen to be correct by observing that $L = e(h, E_\sigma)^k$, so therefore $$\frac{F_\sigma}{L^{\frac{1}{k}}} = R_\sigma.$$

Figure 11:
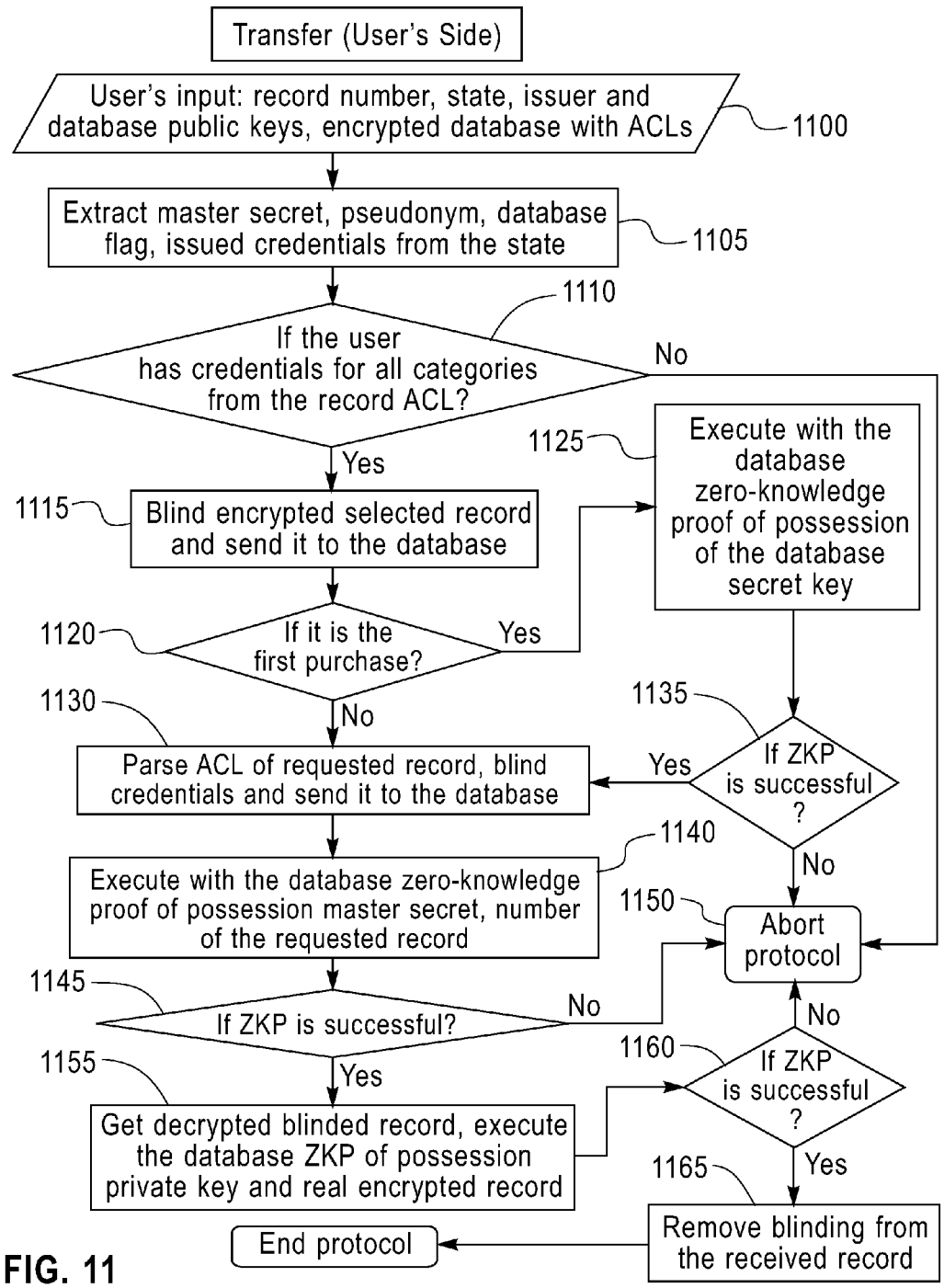
FIG. 11: Is a flow diagram illustrating the user's side of the Transfer protocol of FIG. 10.

FIG. 11 illustrates the user's side of the transfer protocol. In step 1100 the record number, the state, the public keys of the Issuer I and of the database server DB, and the encrypted database with the access control list is obtained. Then in step 1105 the master secret, the pseudonym, the database flag, and the issued credentials are extracted from the state. In step 1110 it will be determined if the user has the credentials for all categories from the access control list of the record. If this is not the case, then the protocol will be aborted in step 1160. Otherwise, the encrypted record will be blinded and then send to the database server DB in step 1115. Then it will be checked in step 1120 if this is the first purchase of the record from the database server DB. If this is not the case, then the processing continues with step 1130. If that is the case, then a zero-knowledge proof will be executed with the database server DB in step 1125 in order to determine if the user is in possession of the secret key of the database server DB. In step 1135 it will be determined if the zero-knowledge proof (ZKP) was successful. If that was not the case, then the protocol will be aborted in step 1150. Otherwise, the processing continues with step 1130. In step 1130 the access control list of the encrypted record will be parsed, the credentials will be blinded and then send to the database server DB. Afterwards, a zero-knowledge proof will be performed with the database server DB in step 1140 in order to determine the possession of the master secret key and the number of the requested record. It will be determined in step 1145 if the zero-knowledge proof was successful. If that was not the case, then the protocol will be aborted in step 1150. Otherwise, the decrypted blinded record will be obtained from the database server DB and a zero-knowledge proof with the database server DB is performed in step 1155 in order to determine the possession of the private key and the real encrypted record. In step 1160 it will be determined if the zero-knowledge proof was successful. Finally, the blinding will be removed from the received record in step 1165. Steps 1120 and steps 1125 are not strictly necessary and can be avoided in a different embodiment.

Figure 12:
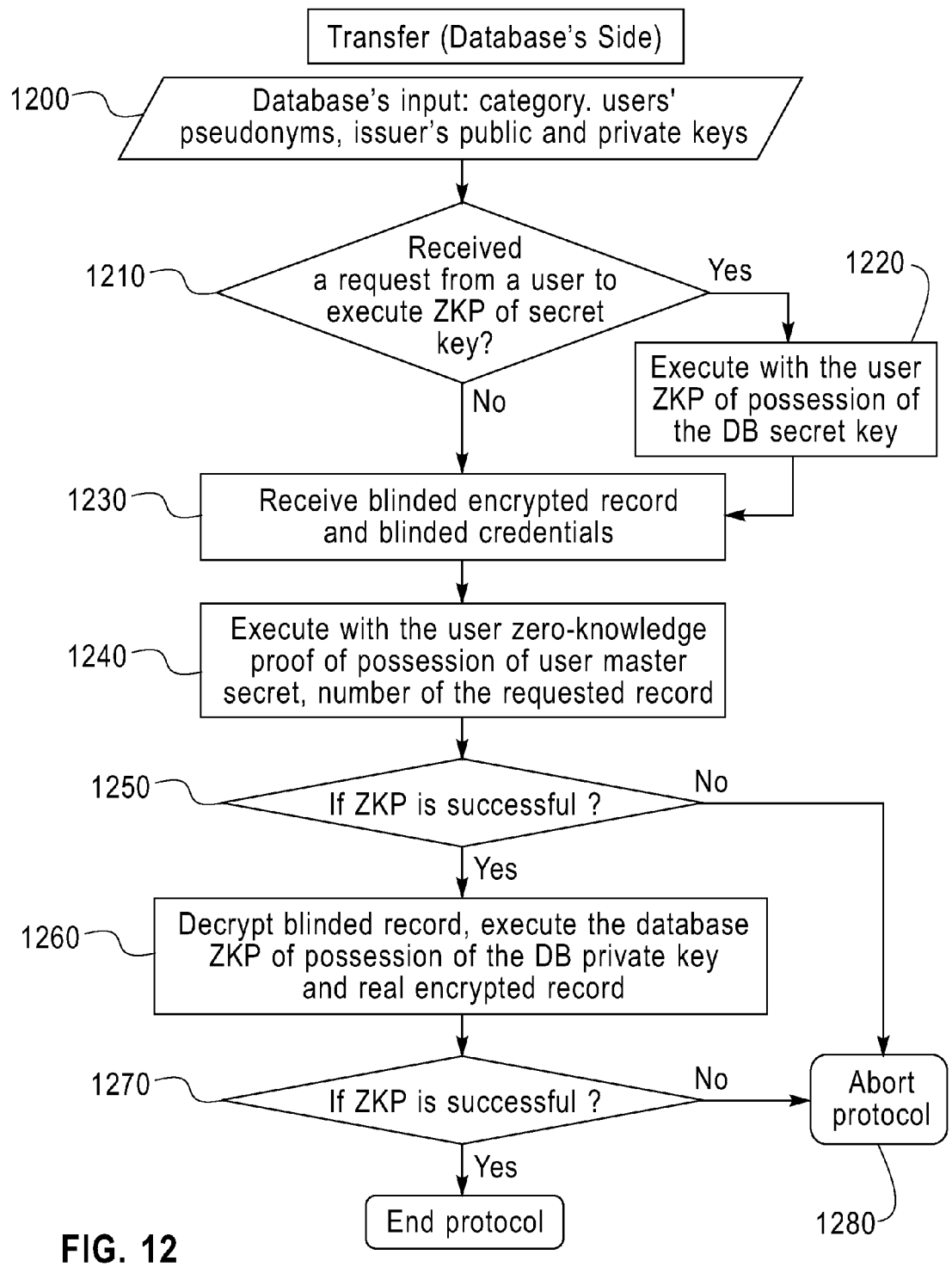
FIG. 12: Is a flow diagram illustrating the issuer's side of the Transfer protocol of FIG. 10.
Figure 13:
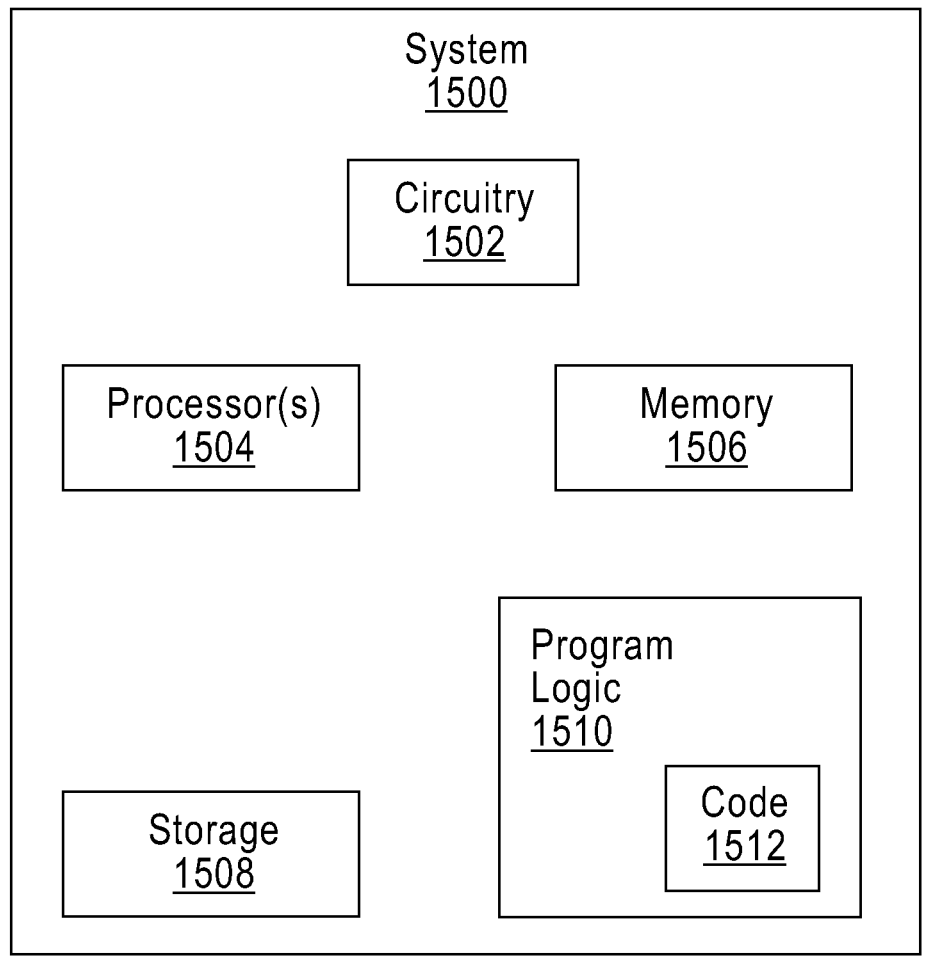
FIG. 13: Is a block diagram of a system in which certain embodiments may be implemented.

FIG. 12 shows the database server side of the transfer protocol. The category data, pseudonyms of users, and the public and private keys of the Issuer I are obtained in step 1200. In step 1210 it will be determined if a request from a user to execute a zero-knowledge proof for the secret key was received. If that was not the case, then the processing continues with step 1230. If that was the case, then in step 1220 the zero-knowledge proof will be performed with the user in order to determine if the user is in possession of the secret key of the database server DB. In step 1230 the blinded encrypted record and the blinded credentials are received from the user. Then a zero-knowledge proof will be performed with the user in step 1240 in order to determine that user possesses the master secret key and the number of the requested record. It will be determined in step 1250 if the zero-knowledge proof was successful. If that was not the case, then the protocol will be aborted in step 1280. Otherwise, the blinded record will be decrypted, and a zero-knowledge proof will be performed with the user in step 1260 in order to determine if the user is in possession of the private key of the database server DB and the real encrypted record. In step 1270 it will be determined if the zero-knowledge proof was successful. If that was not the case, then the protocol will be aborted in step 1280.

The oblivious transfer protocol with access control according to the invention has the following general characteristics:

Only users satisfying the access conditions for a record can access that record;

The service (database) provider does not learn which record a user accesses;

The service (database) provider shall not learn which attributes, roles, etc. a user has when she accesses a record, i.e., access shall be completely anonymous, nor shall it learn which attributes the user was required to have to access the record.

The database server cannot tell which user makes a query, nor can it tell which record is being accessed. That is, the database server only gets to know that some user accesses some record for which the user obtained the necessary credentials. If the database server colludes with the issuer and potentially with other users, then they can only try to identify the user or her selection based on which credentials were issued to whom, and which credentials are necessary to successfully access which record. A cheating user alone cannot access a record for which she does not have the necessary credentials. Colluding users cannot pool their credentials, meaning that they cannot access any records that none of them would have been able to obtain individually. If the issuer colludes with one or more users, they can only obtain as many records from the database as the number of transfer queries that were performed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 12 illustrates a block diagram of a computer system 1500 in which certain embodiments may be implemented. The system 1500 may include a circuitry 1502 that may in certain embodiments include a microprocessor 1504. The computer system 1500 may also include a memory 1506 (e.g., a volatile memory device), and storage 1508. The storage 1508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1508 may comprise an internal storage device, an attached storage device and/or a network accessible storage device. The system 1500 may include a program logic 1510 including code 1512 that may be loaded into the memory 1506 and executed by the microprocessor 1504 or circuitry 1502. In certain embodiments, the program logic 1510 including code 1512 may be stored in the storage 1508. In certain other embodiments, the program logic 1510 may be implemented in the circuitry 1502. Therefore, while FIG. 9 shows the program logic 1510 separately from the other elements, the program logic 1510 may be implemented in the memory 1506 and/or the circuitry 1502.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer system comprising:
   a memory comprising computer readable code and a database. the database comprising a plurality of records each with an associated index and a list of one or more categories;
   at least one processor;
   wherein the at least one processor, in response to execution of the computer readable code, causes the computer system to perform the following:
   generating an encryption key for each of the plurality of records such that the encryption key is derived from at least the index of the record, the list of the one or more categories for the record, and a secret key of a database server; and
   encrypting each of the plurality of records with a corresponding encryption key.

2. The computer system of claim 1, wherein the at least one processor, in response to execution of the computer readable code, further causes the computer system to perform the following:
providing an encryption key for a particular record to a user, in response to successful performance of a proof with the user at least regarding possession by the user of one or more credentials for all the one or more categories in the list corresponding to the particular record.

3. A method comprising:
for each or a plurality of records in a database on a database server, the database comprising the plurality of records each with an associated index and a list of one or more categories, performing:
generating an encryption key that is derived from at least an index of the record and the list of one or more categories for the record, and a secret key of the database server; and
encrypting the record with the key.

4. The method of claim 3, further comprising:
providing an encryption key for a particular record to a user in response to successful performance of a proof with the one user regarding at least possession of one or more credentials for all the one or more categories in the list corresponding to the particular record.

5. The method of claim 3, wherein at least one category is a data category that the user is allowed to access.

6. The method of claim 3, wherein at least one category is an attribute that the user needs to have in order to access the particular record.

7. The method of claim 4, wherein there are a plurality of categories and wherein providing an encryption key comprises providing a providing the encryption key for the particular record to the user, at least in response to successful performance of the proof with the user regarding possession by the user of a plurality of credentials for all the plurality of categories in the list corresponding to the particular record.

8. The method of claim 4, where the proof is a zero knowledge proof.

9. The method of claim 7, further comprising receiving at the database server from the user a blinded version of an encrypted version of the particular record and a blinded version of the index corresponding to the particular record, and wherein successful performance of the proof with the user regarding possession by the user of one or more credentials for all the one or more categories in the list corresponding to the particular record also comprises successful performance of the proof with the user regarding possession by the user of the encrypted version of the particular record and the corresponding index of the particular record.

10. A computer program product comprising a non-transitory computer readable storage medium having program code embodied therewith, the program code readable/executable by a computer system to perform the method of claim 3.

11. A method, comprising:
performing, on a user computer system, a proof with a database server regarding at least possession by a user corresponding to the user computer system of one or more credentials for all of one or more categories in a list corresponding to a particular record in a database of a plurality of encrypted records on the database server, wherein each of the plurality of encrypted records is encrypted using an encryption key that is derived from at least an index of the record, the list of one or more categories for the record, and a secret key of the database server; and
receiving, at the user computer system and from the database server, an encryption key for a particular record in response to successful performance of the proof.

12. The method of claim 11, wherein at least one category is a data category that the user is allowed to access.

13. The method of claim 11, wherein at least one category is an attribute that the user needs to have in order to access the particular record.

14. The method of claim 11, wherein there are a plurality of categories and wherein performing the proof further comprises performing the proof with the database server regarding possession by the user of a plurality of credentials for all the plurality of categories in the list corresponding to the particular record.

15. The method of claim 11, where the proof is a zero knowledge proof.

16. The method of claim 14, further comprising sending from the user computer system to the database server a blinded version of an encrypted version of the particular record and a blinded version of the index corresponding to the particular record, and wherein performing the proof also comprises performing the proof with the database server regarding possession by the user of the encrypted version of the particular record and the corresponding index of the particular record.

17. The method of claim 14, further comprising, prior to the performing the proof, performing an issuing protocol with an issuer computer system in order to receive the plurality of credentials for all the plurality of categories in the list corresponding to the particular record and receiving, responsive to performing the issuing protocol, the plurality of credentials for all the plurality of categories in the list corresponding to the particular record.

18. A computer program product comprising a non-transitory computer readable storage medium having program code embodied therewith, the program code readable/executable by a computer system to perform the method of claim 11.

* * * * *